Jan. 30, 1940.    H. A. REIMERS    2,188,311
COMPOSITION FOR STOPPING LEAKS
Filed Jan. 25, 1938    8 Sheets-Sheet 8

FIG. 8

INVENTOR
Hans A. Reimers
BY
Griswold & Burdick
ATTORNEYS

Patented Jan. 30, 1940

2,188,311

UNITED STATES PATENT OFFICE 2,188,311

COMPOSITION FOR STOPPING LEAKS

Hans A. Reimers, Midland, Mich., assignor of one-third to Thomas Griswold, Jr., and one-third to James W. Rebbeck, both of Midland, Mich.

Application January 25, 1938, Serial No. 186,866

5 Claims. (Cl. 134—17.5)

The invention relates to a composition for and method of stopping leaks in vessels, conduits, pipes, and like structures of concrete, earthen ware, earth and rock, and particularly those of metal designed to hold or transmit gases or liquids.

One of the objects of the invention is to provide an aqueous liquid having the property of forming a moderately flexible gel-like sealing deposit in situ when introduced into a leak and there subjected to electrolysis, which deposit bonds itself firmly to the surface of the leaking part, thereby forming a substantially permanent leak repair capable of strongly resisting displacement by fluid pressure.

Another object is to provide an aqueous liquid leak-stopping composition that does not require the presence therein of suspended filterable matter for its operation.

Another object is to provide an aqueous leak-stopping composition which may be used effectively in the presence of water and does not require air-drying for its operation.

Another object is to provide an aqueous liquid leak-stopping composition that does not deteriorate in ordinary usage and the unused portion thereof is capable of reuse.

Another object is to provide an aqueous liquid leak-sealing composition that remains liquid and non-sealing until subjected to electrolysis.

A further object is to provide a method of stopping up leaks whereby the so stopped up leak may be subjected to a moderate amount of flexing without destroying the seal. Still other objects and advantages will appear as the description proceeds.

I have discovered that by mixing an aqueous solution containing a water-soluble silicate and an aqueous solution of one of the water-soluble inorganic metal salts of aluminum, cadmium, trivalent chromium, divalent copper, trivalent iron, divalent manganese, trivalent tin, and zinc in certain proportions, hereinafter set forth, mobile solution (i. e., solutions which are substantially free from filterable precipitates or jellies) are obtained which are capable of substantially completely passing through ordinary filter paper and normally remain in this state apparently indefinitely, but when subjected to electrolysis have the property of depositing a water-resistant semi-rigid gel in contact with the anode. I have further discovered that by maintaining such solution in contact with that portion of a vessel conduit, pipe, or the like having a leak to be repaired and bringing about electrolysis of the solution in situ, a semi-rigid gel is formed over and in the leak effectively sealing it. The sealing deposit so obtained is impervious to fluids, has the advantage of being slightly flexible yet not easily displaced when subjected to mechanical strain. After the sealing deposit is produced, the excess solution not transformed into the gel may be removed and stored, preferably in a wooden or glass vessel, for reuse.

The invention then consists of the composition for and method of stopping leaks hereinafter fully described and particularly pointed out in the claims, reference being had to the accompanying drawings illustrating various embodiments of the invention.

In the said annexed drawings—

The method of plotting the proportions of the ingredients in the composition is that proposed by Gibbs, Trans., Conn. Acad., 1876, vol. 3, page 176. In this method the corners of the triangle represent 100 per cent of each of the ingredients and the relative proportions or percentages of the three ingredients in any ternary mixture of them are read along the perpendicular line drawn from the side of the triangle opposite the corner representing the ingredient to the point in the triangle representing the mixture or composition.

Figure 1:
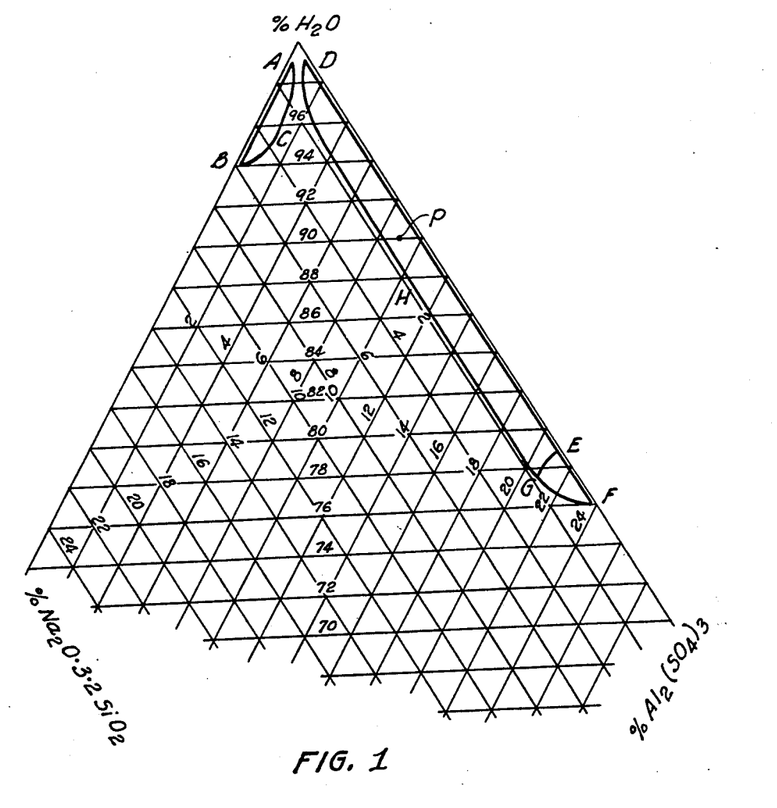
Fig. 1 is a portion of a triangular diagram showing a graph of the proportions of water, sodium silicate, and aluminum sulphate in my leak-stopping composition plotted with triangular coordinates.

Since in most of the compositions shown on the diagrams a relatively high percentage of water may be present with a relatively small percentage of the other two ingredients only that portion of the triangle is shown which is sufficient to completely represent the range of proportions of the ingredients for the leak-stopping solutions illustrated. Referring to Fig. 1 for an illustration of the method of reading the diagrams, the point P may be selected by way of example. As shown, the perpendicular distance of the point P from the bottom or horizontal side of the triangle (which is foreshortened and, therefore, not shown) is 90 per cent as indicated by the perpendicular scale and, being opposite the water corner, represents the per cent of water. The perpendicular distance of the point P from the left hand side of the triangle similarly represents 9 per cent of aluminum sulphate, and the perpendicular distance of the point P from the right hand side represents 1 per cent of sodium silicate ($Na_2O.3.2SiO_2$). The percentage composition of any other point is read in similar manner reference being made in each case to the percentage scales shown.

In compounding the leak-stopping solutions according to the invention it is preferable to first make a stock solution of the soluble silicate and of the metal salt to be used, each in a suitable concentration so that by suitable diluting the stock solutions and then mixing these the desired leak-stopping solution is obtained. For the soluble silicate I may use an alkali metal silicate, such as potassium or sodium silicate, preferably the latter, generally in a concentration of about 20 per cent of silicate by weight as a stock solution. Commercial water glass may be used in which the ratio of $Na_2O$ to $SiO_2$ therein is 1:3.2, although other ratios may be employed. For the metal salt I may employ a soluble salt of any one of the aforementioned metals, such as the sulphate, chloride, or nitrate. I prefer to use the sulphate or chloride, because these are usually the cheapest, and in a concentration generally of about 20 per cent by weight for the stock solution. Other concentrations of the stock solutions of either the silicate or the metal salt may be used, if desired, and, as will be seen hereinafter, are necessary in some instances for the preparation of certain of the leak-stopping solutions in order that the proper proportion of water, metal salt, and silicate will be obtained.

The manner in which the leak-stopping solution is prepared from the separate stock solutions of the constituents is important, it being essential to mix the stock solutions (diluted if necessary) in a certain order according to the metal salt employed, and in some instances according to the proportions to be obtained in the resulting leak-stopping solution. The order of mixing as well as the proportions will be better understood by referring to the diagrams.

In Fig. 1, the area bounded by the graph ABC and that bounded by DEFGH represent compositions of leak-stopping solutions containing aluminum sulphate in the proportions which function according to the invention. Thus two series of solutions can be made from sodium silicate and aluminum sulphate. In one the solutions contain approximately 0.05 to 0.3 per cent of aluminum sulphate with from 0.05 to 6 per cent of sodium silicate (i. e., area ABC), in the other approximately 0.05 to 23 per cent of aluminum sulphate is used with from 0.05 to 1.8 per cent of sodium silicate (i. e., area DEFGH). The solution compositions in the area ABC can be prepared by adding a stock sodium silicate solution, diluted to the proper concentration, to a stock aluminum sulphate solution, of proper concentration or vice versa, these concentrations being such that upon mixing the desired composition is obtained. To prepare the solutions in the area EFG, the silicate solution is added to the aluminum sulphate solution. Solutions having the composition shown in the area DEGH can be prepared by adding the aluminum sulphate solution to the sodium silicate solution.

Figure 2:
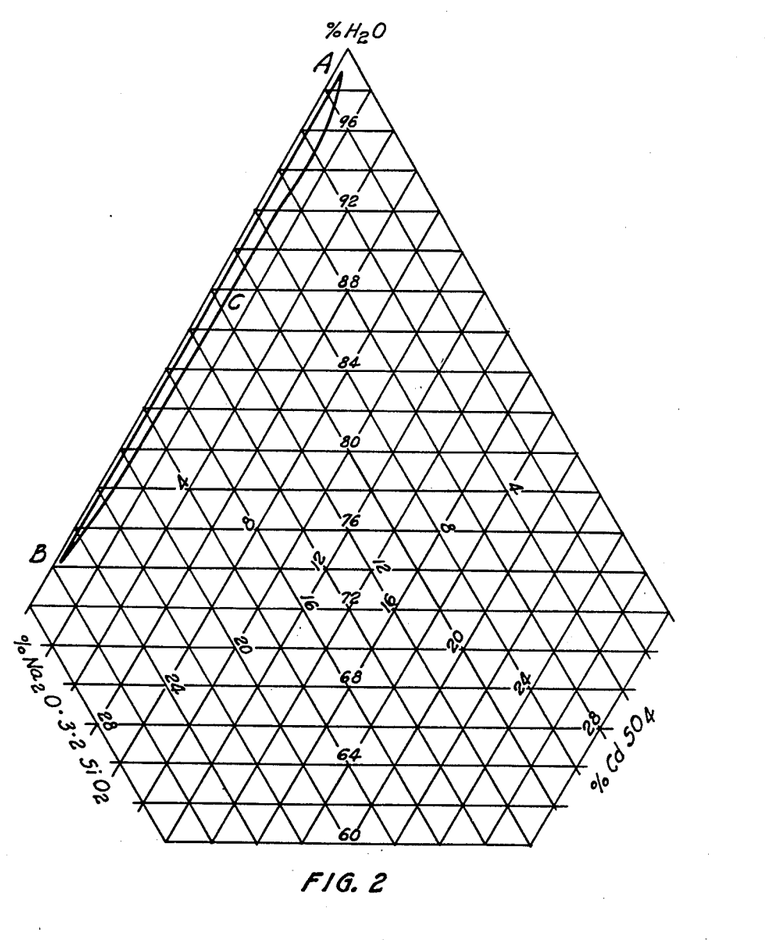
Fig. 2 is a similar diagram showing the proportions of water, sodium silicate, and cadmium sulphate.

In Fig. 2 the area bounded by the graph ABC represents the proportions of water, cadmium sulphate, and sodium silicate in which these ingredients can be mixed to produce a leak-stopping solution capable of functioning according to the invention. According to the graph, the proportions are approximately 0.05 to 1 per cent of cadmium sulphate with from 0.05 to 26.5 per cent of sodium silicate. These solutions are formed by adding a stock silicate solution to a stock cadmium sulphate solution, the stock solutions being suitably diluted if necessary.

Figure 3:
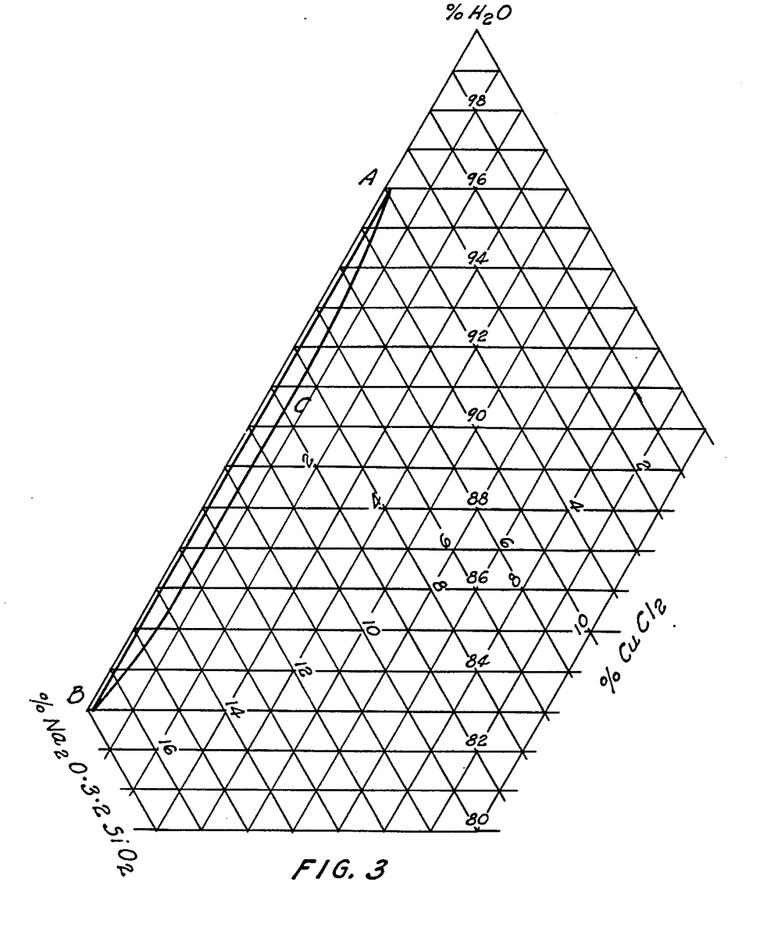
Fig. 3 is a similar diagram showing the proportions of water, sodium silicate, and cupric chloride.

In Fig. 3 the area bounded by the graph ABC represents solution compositions having similar properties to those shown in the previous graphs, the proportions of the constituents being approximately 0.05 to 0.6 per cent of cupric chloride with from 4 to 16.5 per cent of sodium silicate. These solutions are formed by adding a stock silicate solution to a stock cupric chloride solution, the stock solutions being suitably diluted if necessary.

Figure 4:
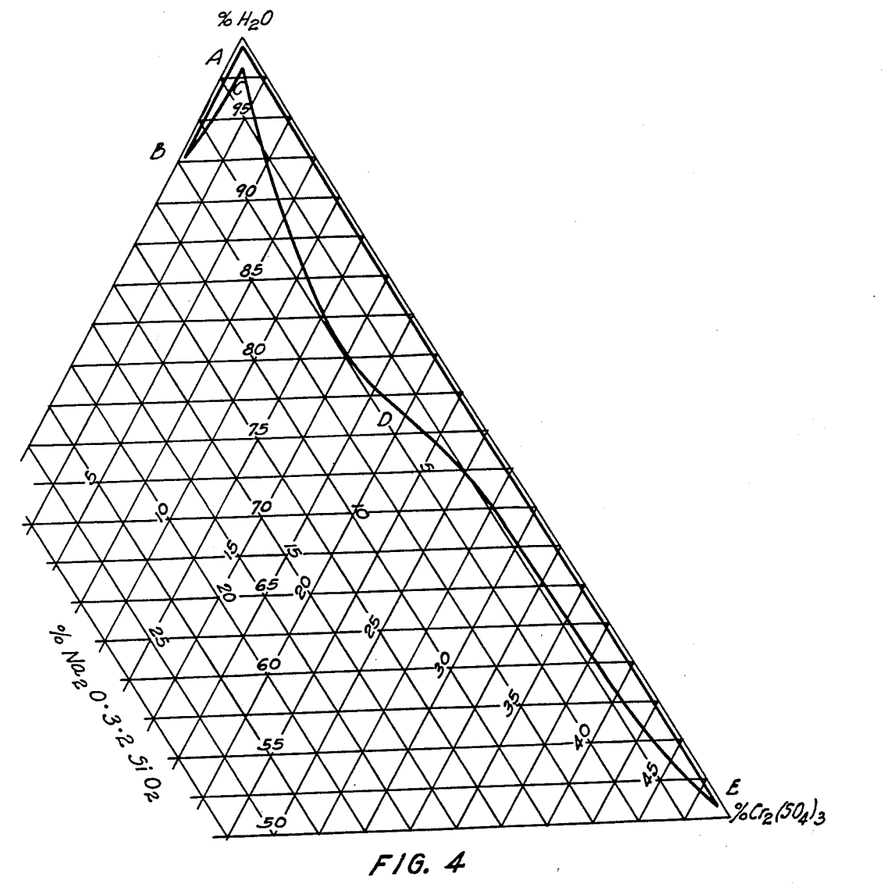
Fig. 4 is a similar diagram showing the proportions of water, sodium silicate, and chromium sulphate.

In Fig. 4 the area bounded by the graph ABCDE represents solution compositions having similar properties to those shown in the previous graphs, the proportions of the constituents being approximately 0.05 to 1 per cent of chromium sulphate with from 1 to 7.5 per cent of silicate, or from about 0.5 to 48.5 per cent of chromium sulphate with from 0.05 to 5 per cent of sodium silicate. These solutions are prepared by adding a stock silicate solution to a stock chromium sulphate solution, the stock solutions being suitably diluted if necessary.

Figure 5:
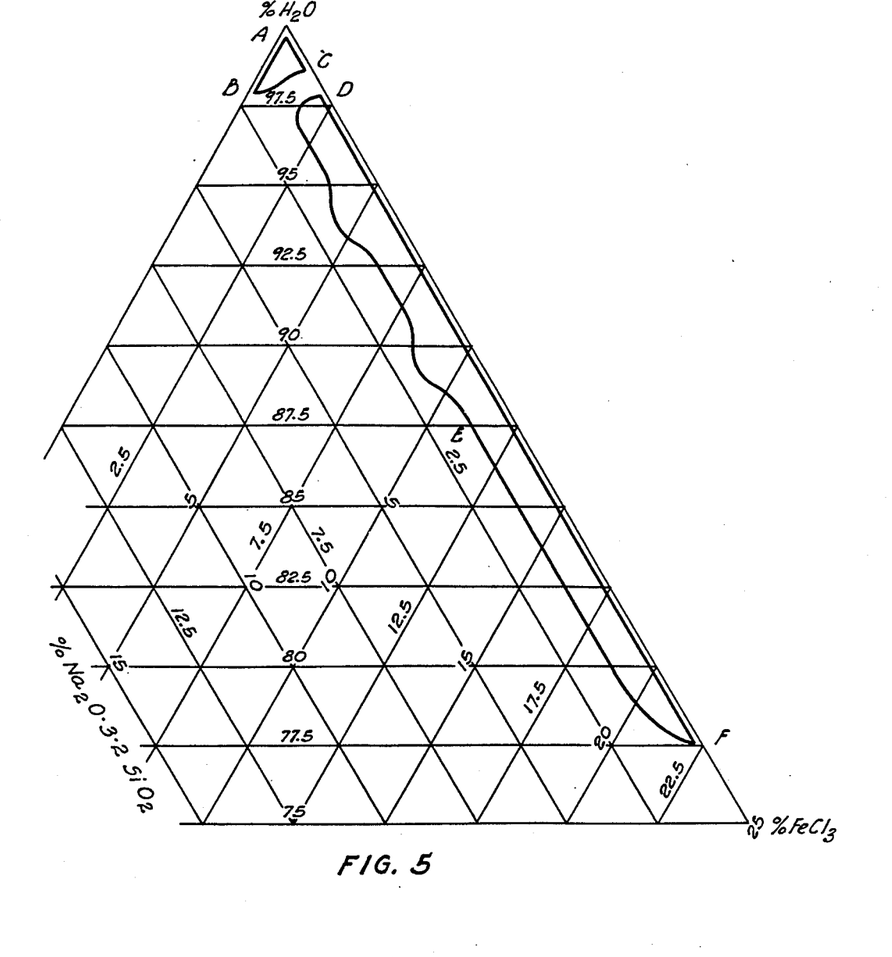
Fig. 5 is a similar diagram showing the proportions of water, sodium silicate, and ferric chloride.

In Fig. 5 two series of leak-stopping solutions can be prepared according to the invention from the stock solutions of sodium silicate and ferric chloride. The one series is shown by the graph ABC within the area of which the effective proportions are approximately from 0.05 to 1 per cent of ferric chloride with from about 0.05 to 1.75 per cent of sodium silicate. The other series is represented by the graph DEF, in which the effective proportions are approximately from 0.05 to 1.8 per cent of sodium silicate with from 1.75 to 22 per cent of ferric chloride. In making these series of leak-stopping solutions the silicate solution is added to the ferric chloride solution.

Figure 6:
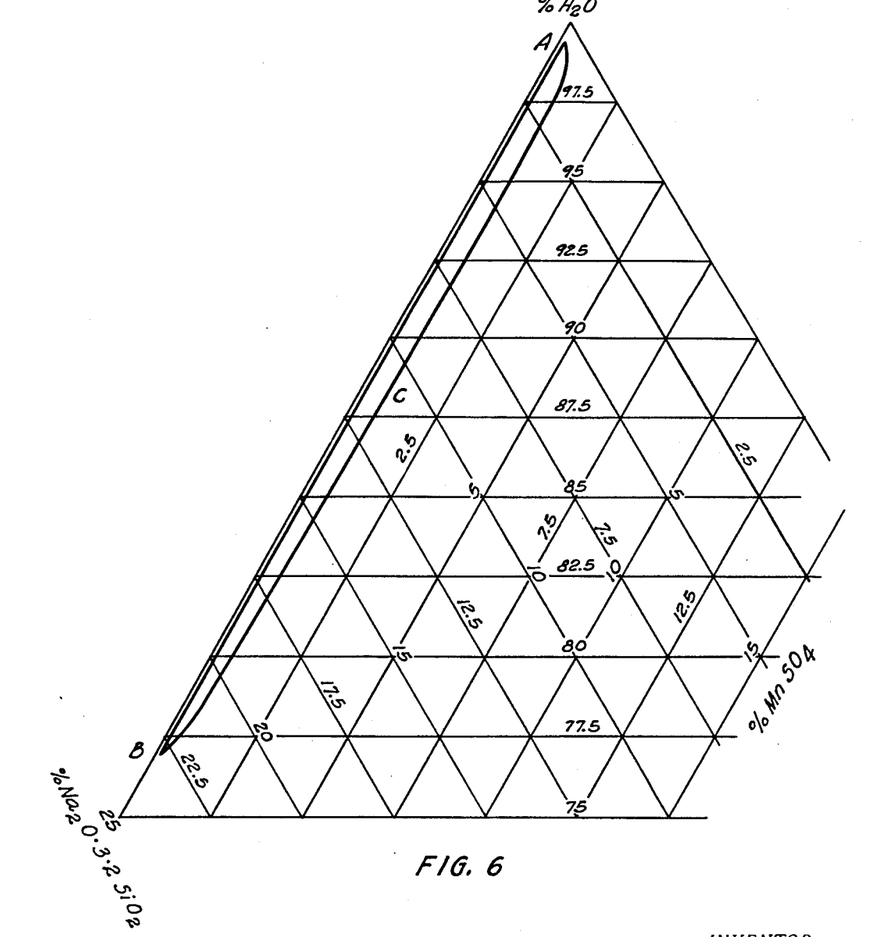
Fig. 6 is a similar diagram showing the proportions of water, sodium silicate, and manganous sulphate.

In Fig. 6 the graph ABC represents similar leak-stopping solution compositions in which manganese sulphate is present in amount of from about 0.05 to 0.75 per cent and sodium silicate from about 0.5 to 23 per cent. These solutions are made by adding a stock manganese sulphate solution to one of sodium silicate, both stock solutions being suitably diluted if necessary.

Figure 7:
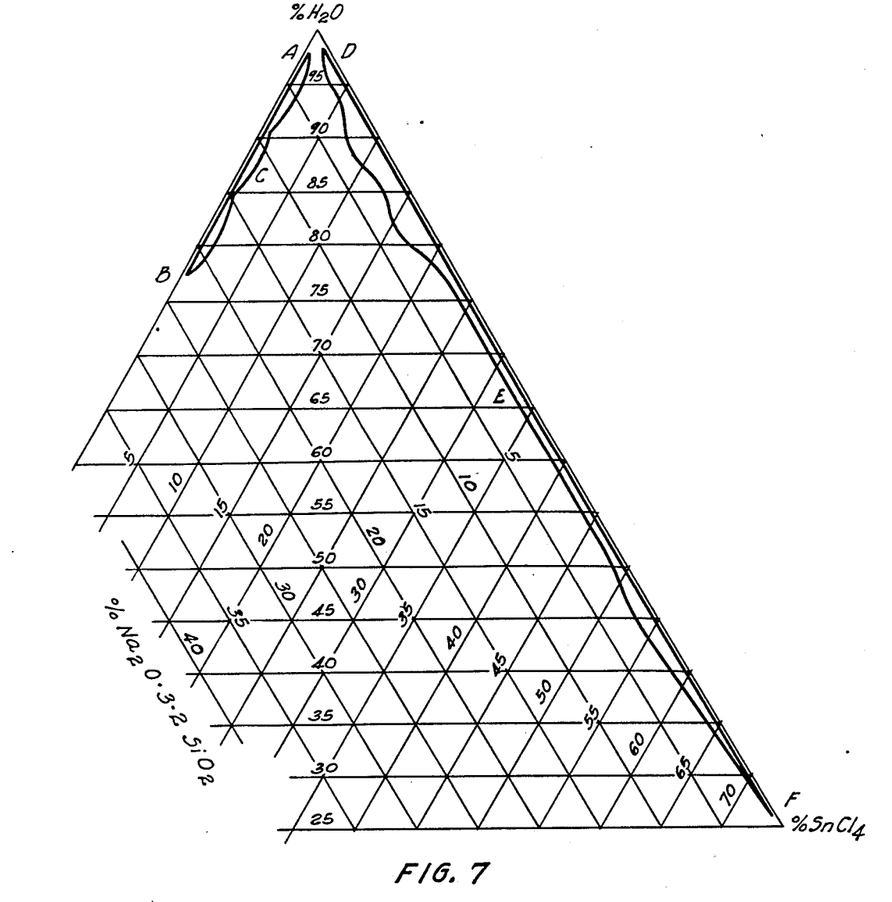
Fig. 7 is a similar diagram showing the proportions of water, sodium silicate, and stannic chloride.

In Fig. 7 two series of leak-stopping compositions are shown which can be prepared from a sodium silicate solution and an aqueous solution of stannic chloride. One series is represented by the area within the graph ABC in which approximately 0.05 to 1.5 per cent of stannic chloride is used with from 1.5 to 22.5 per cent of sodium silicate. The other series is represented by the area within the graph DEF, in which about 0.05 to 3 per cent of sodium silicate is used with about 1.5 to 74 per cent of stannic chloride. Each series of these solutions is made by adding a stock silicate solution to one of stannic chloride suitably diluted if necessary.

Figure 8:
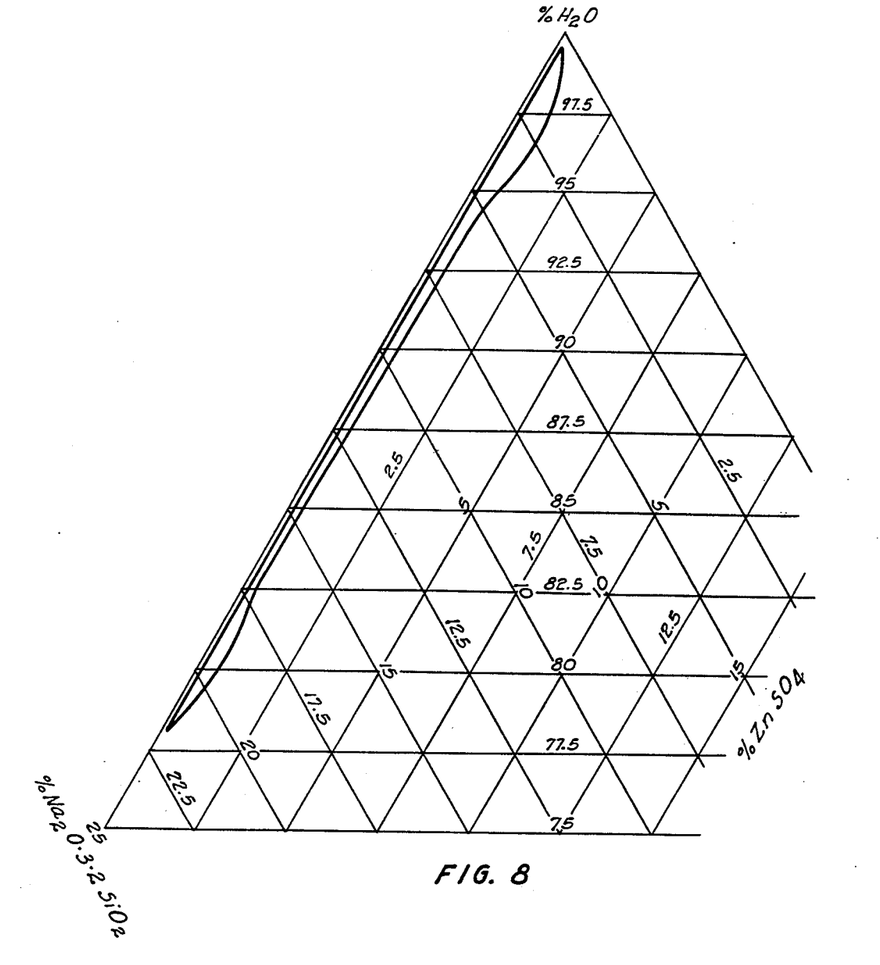
Fig. 8 is a similar diagram showing the proportions of water, sodium silicate, and zinc sulphate.

In Fig. 8 leak-stopping compositions are shown by the area within the graph ABC in which approximately 0.05 to 1 per cent of zinc sulphate is used with from about 0.2 to 21.5 per cent of sodium silicate, the order of mixing the stock solutions being to add the silicate solution to the zinc sulphate solution suitably diluted if necessary.

Of the mixtures which can be formed of water, a soluble silicate and a water-soluble inorganic metal salt, I have found that only those which are capable of: (1) passing substantially wholly through ordinary filter paper (i. e., substantially free from a filterable precipitate), (2) remaining liquid upon standing for a relatively long time (several days or longer), and (3) being transformed into a semi-rigid gel upon being subjected to electrolysis, can be used according to my invention. The proportions in which upon mixing the stock solutions of the enumerated constituents in the order prescribed leak-stopping solutions are produced having these special properties has been determined for a number of mixtures, those illustrated by the examples described above and shown by the respective areas enclosed by the graphs being typical. However, it is evident that the proportions do not follow a simple law other than that contained in the three limitations above set forth, and excepting those proportions lying near the outside edges of the graphs where the minimum limiting proportions occur at about 0.05 per cent for either the metal salt or the soluble silicate, as the case may be. The minimum limiting proportions are given by the straight lines AB and DEF on Fig. 1, AB on Fig. 2, AB on Fig. 3, AB and AE on Fig. 4, AB, AC, and DF on Fig. 5, AB on Fig. 6, AB and DF on Fig. 7, and AB on Fig. 8, for example, and the maximum proportions by the curved boundaries of the graphs.

Beyond the curved boundaries of the graphs (i. e. outside the area enclosed by the curved lines) mixtures are obtained which exhibit entirely different properties and either spontaneously become non-flowing gelatinous systems when prepared or shortly thereafter or form suspensions in which the metal salt has been practically all precipitated and, therefore, cannot function in the unique manner of my solutions. When the proportion of the metal salt or of the silicate is less than 0.05 per cent, the solution, although fluid and generally free from a filterable precipitate, cannot be transformed into a semi-rigid gel by electrolysis.

To stop up leaks the solution, prepared in the manner described, is maintained in contact with the leaking equipment in any convenient manner, as by filling the equipment or flowing the solution into or through the leak. While in contact with the leaking place the solution is subjected to electrolysis. This may be accomplished in various ways according to the nature of the article or equipment to be repaired. If the article or equipment be of metal it may be made the anode in the electric circuit which is completed through a suitable cathode such as an iron plate immersed in the solution. In cases where the article itself is not an electric conductor, an anode may be placed on one side of, and preferably in contact with, the article to be treated and a cathode on the other and the whole immersed in the solution. The electrolyzing current is then passed from the cathode to the anode through the solution and the portion of the article to be treated. A potential of about 1 to 4 volts is sufficient, but other voltages may be used.

In some instances it is not always necessary to apply an external source of potential to effect the electrolysis, as when the article comprises dissimilar metals, and the leak to be repaired occurs at or near the junction of such metals. For example, a leak occurring in the joint of a lead-calked iron pipe can be readily rendered fluid tight by merely filling the interior of the pipe with the leak-stopping solution and applying sufficient pressure upon the solution, if necessary, to introduce it into the leak. The potential produced by contact of the solution with both the lead of the calking and the iron walls of the pipe, which are electrically connected together by virtue of being in contact with each other, is sufficient to bring about the electrolysis and deposition of the leak-sealing deposit in a comparatively short time.

In some instances the metal itself of a leaking article to be repaired may be so non-homogeneous as to set up potential differences when the leak-stopping solution is brought into contact therewith sufficient to bring about deposition of a sealing deposit in situ.

When the leaks to be stopped up are relatively large and would permit a substantial loss of leak-stopping solution during the deposition of the sealing gel, as when sealing leaks in a large pipe system or the like, such losses may be reduced or prevented by adding to the leak-stopping solution a moderate percentage of fibrous asbestos.

After the sealing gel deposit is obtained to the desired extent, that part of the solution which has not become transformed into a gel may be removed and stored in a glass or wooden vessel for reuse. It is an advantage in some instances to further treat the deposited gel with an aqueous solution of calcium chloride containing from 5 to 20 per cent of $CaCl_2$ which has the effect of further hardening it and thereby making it more resistant to erosion.

The following examples are further illustrations of the method of carrying out the invention:

Example 1

2.43 gallons of a 20 per cent stock solution of sodium silicate was added to 0.13 gallon of a 20 per cent stock solution of aluminum sulphate solution diluted with 7.44 gallons of water, the solution being stirred during the addition. The resulting leak-stopping solution (approximately 10 gallons) was substantially free from filterable precipitate and substantially as fluid as water. The solution was then introduced into a section of cast iron pipe having a longitudinal crack therein so as to pass the solution into the crack and allow the formation therein of a leak-sealing deposit, upon being subjected to electrolysis. In this case it was found that there was a sufficient potential developed by the solution in contact with the iron pipe itself due to inhomogeneity of the metal to effect electrolysis without the need for applying an external E. M. F. After the leak-sealing deposit occurred, the solution was withdrawn from the pipe and then it was flushed with water. On testing the pipe for leakage after the treatment it was found to be able to withstand more than 75 lbs./sq. in. water pressure without leakage.

Example 2

In this test there was treated a section of a cast iron hub and spigot water main. The main was 24 inches in diameter and 1249 feet long laid across a river in the river bed and normally carried 3 to 4 million gallons of water per day. This main developed leakage amounting to about 200 gallons per hour at 60 pounds per square inch. Most of the leakage appeared to be at the lead-calked joints of which there were 112 as shown by water meter readings and by closing each end of the main and displacing the water therefrom by air, bubbles of which were observed to rise to the river's surface above many of the joints. In treating this main, the water therein, approximately 33,000 gallons, was displaced by introducing thereinto my leak-stopping solution comprising sodium silicate, aluminum sulphate, and water in the relative proportions of about 5 per cent, 0.7 per cent, and 94.3 per cent, respectively. The leak-stopping solution was made up by adding 4000 gallons of a 5 per cent sodium silicate solution to 36,000 gallons of water mixed together in batches of 900 gallons each and to each batch was added 25 gallons of an aqueous solution of aluminum sulphate containing 2.4 pounds per gallon, while the batch of diluted sodium silicate was vigorously agitated. 10 pounds of fibrous asbestos was incorporated in each batch. After the main was filled, which required the introduction thereinto of about 40,000 gallons of solution, some 7000 gallons of which was lost through the leaks while being plugged by the solution, pressure was applied to the solution and gradually increased in intensity at the rate of 5 pounds per hour until a pressure of 85 pounds per square inch was reached in the main. This pressure was then maintained for about 10 hours by pumping additional amounts of the leak-plugging solution into the main to compensate for losses during the treatment. At the end of this period the leakage had practically ceased. The solution was then displaced with a 4 per cent aqueous solution of calcium chloride, upon which pressure was applied in gradually increasing intensity until 65 pounds per square inch was reached. This pressure was maintained for about 18 hours during which practically no leakage of solution was observed. The main was then flushed with water and given a final water pressure test at between 60 to 65 pounds per square inch. It was found that substantially no leakage occurred.

This application is a continuation-in-part of my application Serial No. 747,211, filed October 6, 1934.

Other modes of applying the principle of my invention may be employed instead of those explained, change being made as regards the method and materials herein disclosed, provided the step or ingredients stated by any of the following claims or the equivalent of such stated step or ingredients be employed.

I therefore particularly point out and distinctly claim as my invention:

1. A composition of matter comprising an aqueous solution containing a water-soluble alkali metal silicate and a water-soluble inorganic metal salt selected from the group consisting of the water-soluble inorganic salts of aluminum, cadmium, trivalent chromium, divalent copper, trivalent iron, divalent manganese, tetravalent tin, zinc, in proportions such that the said solution is substantially free from a filterable precipitate, normally remains fluid, and is transformable into a semi-rigid gel upon subjection to electrolysis.

2. A composition of matter comprising an aqueous solution containing a water-soluble alkali metal silicate and an inorganic chloride, sulphate, or nitrate of a metal selected from the group consisting of aluminum, cadmium, trivalent chromium, divalent copper, trivalent iron, divalent manganese, tetravalent tin, zinc, in proportions such that the said solution is substantially free from a filterable precipitate, normally remains fluid, and is transformable into a semi-rigid gel upon subjection to electrolysis.

3. A composition of matter comprising an aqueous solution containing sodium silicate and aluminum sulphate in proportions such that the said solution is substantially free from a filterable precipitate, normally remains fluid, and is transformable into a semi-rigid gel upon subjection to electrolysis.

4. A composition of matter comprising an aqueous solution containing sodium silicate and ferric chloride in proportions such that the said solution is readily filterable, normally remains fluid, and is transformable into a semi-rigid gel upon subjection to electrolysis.

5. A composition of matter comprising an aqueous solution containing sodium silicate and zinc sulphate in proportions such that the said solution is readily filterable, normally remains fluid, and is transformable into a semi-rigid gel upon subjection to electrolysis.

HANS A. REIMERS.